UNITED STATES PATENT OFFICE.

ALEXANDER ALLEN FORBES, OF NORTH VANCOUVER, BRITISH COLUMBIA, CANADA.

FERTILIZER.

1,012,251. Specification of Letters Patent. Patented Dec. 19, 1911.

No Drawing. Application filed August 1, 1910. Serial No. 574,875.

*To all whom it may concern:*

Be it known that I, ALEXANDER ALLEN FORBES, a citizen of the United States, and a resident of North Vancouver, Province of British Columbia, and Dominion of Canada, have invented new and useful Improvements in Fertilizers, of which the following is a full, clear, and exact description.

The object of the invention is to provide new and useful improvements in fertilizers containing fish or fish refuse as a base, whereby the fertilizer can be cheaply manufactured without requiring expensive machinery, and the fertilizer produced is without offensive odor common to fish guanos, and of a high quality on account of the retention of the fish oils contained in the base, and the chemical changing of the oils into soaps and other alkaline substances carrying organic nitrogen of the oils, the fertilizer thus produced not being subject to spontaneous combustion. For the purpose mentioned the base of fish or fish refuse, either raw or steamed, is reduced to a pulp and mixed successively with sodium chlorid and sulfuric acid, after which the mass is allowed to macerate and then is subjected to the action of lime which has been partially air-slaked for a further maceration and until the lime is hydrated. The mass is then mixed with another charge of sodium chlorid, after which it is dried, cooled and mixed with sodium nitrate and potassium chlorid, and, for special crops, with lime phosphate.

The formula for the fertilizer is as follows: Fish and fish refuse from 3,100 lbs. to 4,000 lbs., partially slaked lime from 300 lbs. to 1,200 lbs., sodium nitrate from 500 lbs. to 200 lbs., sodium chlorid from 125 lbs. to 112½ lbs., sulfuric acid (commercial) from 125 lbs. to 125 lbs., potassium chlorid from 300 lbs. to 450 lbs., and for special crops is added lime phosphate from 150 lbs. to 300 lbs.

It is understood that in order to meet the requirements of the farmer, the market gardener and the horticulturist, it is necessary to manufacture the fertilizer in various degrees of strength, the potassium chlorid being added only when the fertilizer is to be used on poor soil, and the lime phosphate is added only for special crops.

In detail I proceed as follows: The fish or fish refuse, either raw or steamed, is first run through rollers or cutters of any approved construction, to reduce it to pulp, which is then weighed or measured to a standard weight, and is then conveyed by any suitable means to a proper receptacle, and one-fifth part by weight of the sodium chlorid is added and thoroughly mixed with the base by rakes or other mechanical means. The whole quantity of the sulfuric acid, as per formula, is then added and thoroughly mixed by mechanical means, and then the mass is allowed to macerate for several hours. In the meantime, while the fish and acid are macerating, one-half of the lime as per formula is spread on the bottom of vats or bins, and the pulp after proper maceration is dumped into the said vats or bins on top of the partially air-slaked lime, and thereupon the other half of the lime is spread over the mass and carefully raked under. The whole mass is now allowed to macerate without disturbance until the lime is thoroughly hydrated, and then the mass is thoroughly turned and mixed by any mechanical device or by hand, after which the mass is spread out and the remainder of the sodium chlorid is added and the mass again mixed. The resultant mass is then conveyed by any mechanical device to a drying device, either rotary or otherwise, and after passing through the drier the mass is cooled by any ordinary method, after which the sodium nitrate, potassium chlorid, and, if necessary, the lime phosphate are added, and thoroughly mixed with the mass by any mechanical device. The resultant fertilizer is then crushed by rolls or other means to a proper marketable fineness, and then sacked, barreled, boxed or otherwise packaged to meet the requirements of the market.

The action of the sulfuric acid upon the base of fish and fish refuse is, first, to coagulate the albumin and cause the rapid exudation of the watery constituents of the fish, which are used in the process for the hydration of the partially slaked lime without the addition of other water, and second to act chemically upon all the albuminoids converting them into acid amids, etc. It also acts upon the phosphate of lime in fish bones, changing it into superphosphate. The one-fifth of sodium chlorid, which is first mixed with the base and then followed by the sulfuric acid, is decomposed and changed to sodium sulfid, and the object of this salt in the fertilizer is to destroy most of the vegetable parasites. The remainder of the sodium chlorid is not chemically acted on, and takes its place in the fertilizer as commercial chlorid. The calcium hydrate referred to in the formula, exerts many chemical influences too complicated to describe, but the principal reactions are, first, the neutralizing of all free acids, and, second, the saponifying of all oils, glycerylesters, etc., and by the heat produced by the hydration of the lime the fish is ultimately cooked. The addition, after the cooling of the mass, of the sodium nitrate, potassium chlorid and lime phosphate, is purely mechanical and the object of the addition is to increase the percentage of nitrogen, potash and phosphoric acid, but has no other chemical significance. It is understood that both the sodium nitrate (Chilean saltpeter) and the potassium nitrate (saltpeter of commerce) may be used. It is understood that the sulfuric acid and the partially slaked lime are used as reducers.

By producing a fertilizer in the manner above described, the oils contained in the fish or fish refuse are not extracted, but are retained and acted upon chemically so as to change the same into soaps and other alkaline substances, retaining the organic nitrogen of the oils, and avoiding the deleterious effects of the free oil upon vegetable life, thus producing a high order of fertilizer, which latter is not subject to spontaneous combustion, thus making it easier to insure either on board ship or in a warehouse, and the loss in the transportation of fertilizer is reduced to a minimum.

By treating the fish and fish refuse in the manner set forth, the offensive odor common to fish guanos is practically destroyed, thus permitting the shipping or storing of the fertilizer along with other merchandise.

Having thus described my invention, I claim as new and desire to secure by Letters Patent:

1. The herein described process for the manufacture of fertilizer having fish or fish refuse as a base, comprising macerating the base under the influence of sodium chlorid and sulfuric acid and again under the influence of lime, then mixing the resultant mass with another charge of sodium chlorid, then drying and cooling the mass and finally mixing it with sodium nitrate.

2. The herein described process for the manufacture of fertilizer having fish or fish refuse as a base, comprising macerating the base under the influence of sodium chlorid and sulfuric acid and again under the influence of lime until the lime is hydrated, then mixing the resultant mass with another charge of sodium chlorid, then drying and cooling the mass and finally mixing it with sodium nitrate.

3. The herein described process for the manufacture of fertilizer having fish or fish refuse as a base, comprising reducing the base to a pulp and mixing the same successively with sodium chlorid and sulfuric acid, then allowing the resultant mass to macerate, then subjecting the macerated mass to the action of lime for a further maceration until the lime is hydrated, then mixing the mass with another charge of sodium chlorid, then drying and cooling it, and finally mixing it with sodium nitrate.

4. The herein described process for the manufacture of fertilizer having fish or fish refuse as a base, comprising reducing the base to a pulp and mixing the same successively with sodium chlorid and sulfuric acid, then allowing the resultant mass to macerate, then subjecting the macerated mass to the action of partially air-slaked lime for a further maceration until the lime is hydrated, then mixing the mass with another charge of sodium chlorid, then drying and cooling it, and finally mixing it with sodium nitrate and potassium chlorid.

5. The herein described process for the manufacture of fertilizer having fish or fish refuse as a base, comprising reducing the base to a pulp and mixing the same successively with sodium chlorid and sulfuric acid, then allowing the resultant mass to macerate, then subjecting the macerated mass to the action of partially air-slaked lime for a further maceration until the lime is hydrated, then mixing the mass with another charge of sodium chlorid, then drying and cooling it, and finally mixing it with sodium nitrate, potassium chlorid and lime phosphate.

6. The herein described fertilizer having fish or fish refuse as a base, which consists of a comparatively inodorous matter, not subject to spontaneous combustion, and containing coagulated albumins and acid amids, sodium nitrate, sodium chlorid, potassium chlorid, and lime phosphate.

7. The herein described fertilizer having fish or fish refuse as a base, which consists of a comparatively inodorous matter not subject to spontaneous combustion and containing coagulated albumins and acid amids, sodium nitrate, sodium chlorid, potassium chlorid, lime phosphate, saponified oils, and containing no free acids.

In testimony whereof I have signed my name to this specification in the presence of two subscribing witnesses.

ALEXANDER ALLEN FORBES.

Witnesses:
  A. E. GALPIN,
  M. I. CLARK.